J. G. STEELE.
SCRAPER.
APPLICATION FILED APR. 23, 1917.
1,253,901.
Patented Jan. 15, 1918.
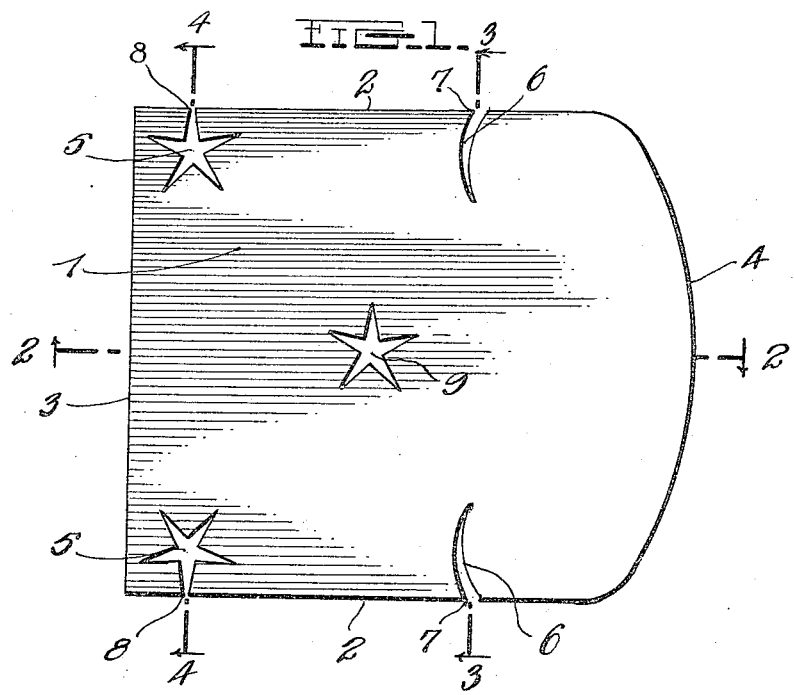
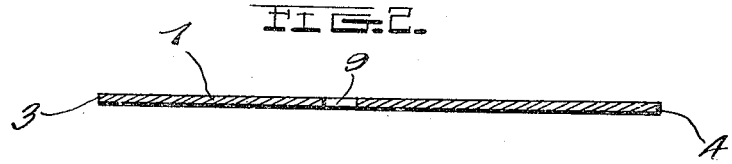
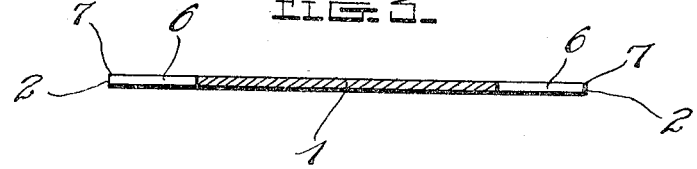
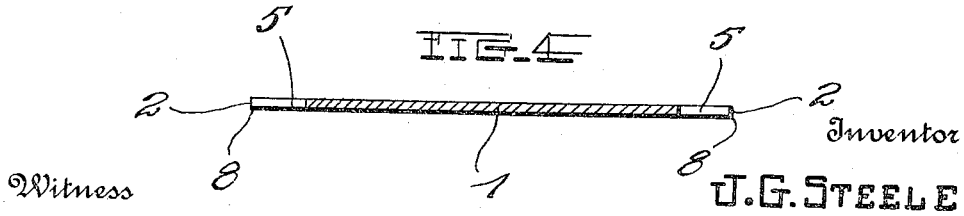
Witness
Inventor
J. G. STEELE
By
Attorneys

UNITED STATES PATENT OFFICE.

JOHN GALE STEELE, OF ST. LOUIS, MISSOURI, ASSIGNOR OF ONE-HALF TO WILLIAM HENRY MENTE, OF ST. LOUIS, MISSOURI.

SCRAPER.

1,253,901.  Specification of Letters Patent.  Patented Jan. 15, 1918.

Application filed April 23, 1917.  Serial No. 163,953.

*To all whom it may concern:*

Be it known that I, JOHN G. STEELE, a citizen of the United States, residing at St. Louis, in the State of Missouri, have invented certain new and useful Improvements in Scrapers; and I do declare the following to be a full, clear, and exact description of the invention, such as will enable others skilled in the art to which it appertains to make and use the same.

My invention relates to scrapers adapted to be used with cooking utensils and the like and its object is to provide a scraper which is so constructed that the scraper may be applied to the sides of a vessel and will remove the sediment therefrom without requiring the exertion of considerable pressure upon the scraper.

One object of my invention is to provide a scraper of this character which is constructed with scraping edges which are adapted to engage differently formed sides and bottoms of cooking utensils and the like and which is thereby applicable to a greater number of cases.

A further object of my invention is to provide a scraper which is simple and cheap to manufacture and easily operated and which is very efficient in operation.

With these and other general objects in view which will appear from the description, my invention resides in the construction, combination and arrangement of parts to be hereinafter more fully described and claimed when taken in connection with the accompanying drawings which form a part of this application and in which:—

Figure 1 is a top plan view of my improved scraper;

Fig. 2 is a longitudinal section on the line 2—2 of Fig. 3;

Fig. 3 is a horizontal section on the line 3—3 of Fig. 1;

Fig. 4 is a horizontal section on the line 4—4 of Fig. 1.

Referring more particularly to the drawings my improved scraper comprises a substantially rectangular flat metal blank 1 which is stamped from a thin sheet of metal. The scraper is provided with straight side scraping edges 2 and with a straight scraping edge at one end as at 3 and has the opposite end bowed outwardly and provided with a scraping edge as at 4. Due to this construction the bowed or curved end 4 may be used to scrape along the dished bottoms of various receptacles and the long straight side edges 2 may be engaged against the sides of various receptacles with the bowed bottom portion 4 in engagement with the bottom, or if the receptacle be provided with a flat bottom the scraper may be inverted and one of the side edges 2 engaged against the side of the receptacle with the one end portion 3 engaged on the bottom of the receptacle.

In the operation of the majority of scrapers in use at the present day it has been found that when the edge of the scraper is brought into engagement with the side of the receptacle to be cleaned that in the case of hard deposits at the sides of the receptacle it is necessary to exert considerable pressure on the scraper to cause the same to enter the sediment and dislodge the same from the side of the receptacle. It is principally the object of my invention to so construct a scraper which will enter the sediment formed on the sides of receptacles without necessitating any undue pressure being exerted upon the scraper which often times, owing to such pressure, will slip and if the scraping edges be sharp, inflict serious injury upon the person using the same.

To this end, I provide irregularly formed slots in the straight side edges 2 of the scraper as clearly illustrated in the accompanying drawings. These slots comprise substantially star-shaped apertures 5 adjacent one end of the scraper and crescent-shaped apertures 6 adjacent the opposite end of the scraper. The said apertures constitute slots of varied dimension and disposed in spaced relation on the scraper and in communication with the side edges to provide breaks in the edges at intervals whereby when the edges are brought into engagement with the sediment lodged on the sides of the receptacle, the edges of the slots, as indicated at 7 and 8 respectively in the drawings, will constitute sharp entrant points which will enter into the sediment and permit of easy entry of the remaining portion of the straight side edge into the sediment to dislodge the same from the side of the receptacle.

By constructing the slots in the form of crescent-shaped apertures and star-shaped apertures, I have provided a means whereby the slots will be of different width adjacent the side edges, the entrant points will be disposed in varied spaced relation from one another, so that when the entry points 8 on the narrower slots formed in the star-shaped apertures 5 are not found applicable, the scraper may be inverted and the wider disposed entrant points 7 of the crescent-shaped apertures brought into engagement with the sediment to more effectually dislodge the same. In the operation of the scraper sediment will collect in the apertures from which it may be readily forced when it is desired to clean the scraper and the remaining ring of sediment left on the side of the receptacle may be readily scraped therefrom by employing the continuous straight scraping edge 3 at one end of the scraper.

I provide an irregular shaped aperture 9 at the center of the scraper whereby the same may be readily hung upon a nail or other support, also the edges of this centrally disposed opening form means of securing a grip on the scraper when the same is held between the thumb and fingers of the hand. However, I do not wish to limit myself to specific arrangement and location of these apertures disposed in their respective relation in the body of the scraper and I desire to be understood that the shape of the apertures may be varied or their location changed without in any way departing from the spirit of my invention as defined in the scope of the following claim.

I claim:

The herein described utensil scraper comprising a flat substantially rectangular metal blank having straight side edges to engage the sides of the receptacles to be cleaned, said side edges being provided with spaced irregular slots of different width breaking said edges and providing differently spaced entrant points, said metal blank having one of its ends bowed outwardly to provide a curved scraping edge, and the opposite end of said blank being straight and unbroken to provide a continuous flat scraping edge whereby the whole periphery of the blank is brought into use, said scraper being provided with a centrally disposed irregular-shaped opening to permit the same to be disposed over a nail when not in use, and the edges of said opening providing means for securing a firm hold on the scraper when the same is held between the thumb and fingers of the hand.

In testimony whereof I have hereunto set my hand in the presence of two subscribing witnesses.

JOHN GALE STEELE.

Witnesses:
R. W. HUGHES,
A. R. THORNTON.

Copies of this patent may be obtained for five cents each, by addressing the "Commissioner of Patents, Washington, D. C."